Oct. 14, 1947.  S. P. O. SUNDGREN ET AL  2,428,858
SWINGABLE LENS MOUNT ASSEMBLY FOR MOTION PICTURE PROJECTORS
Filed April 14, 1944
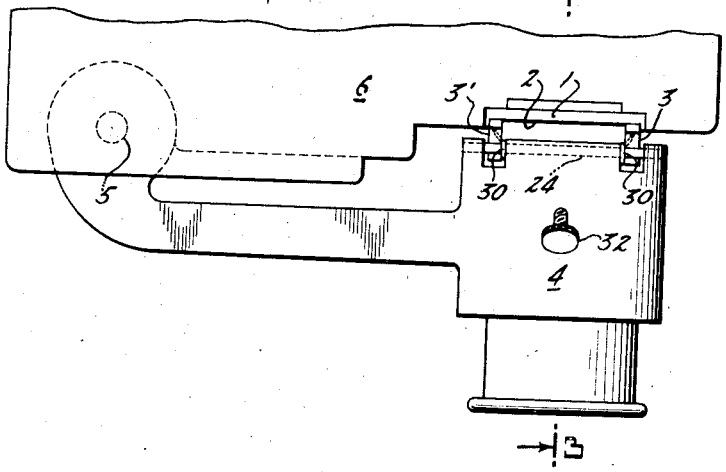
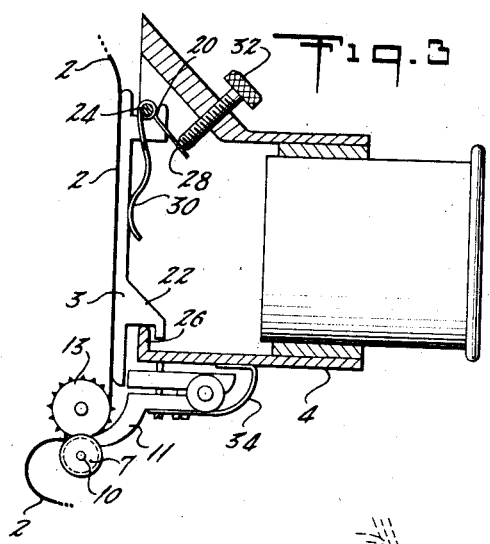
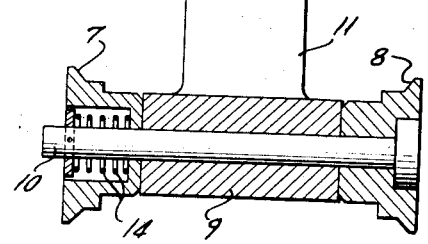
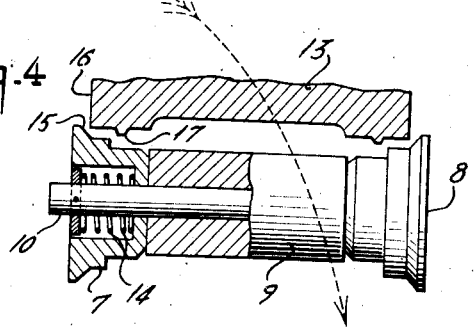
INVENTORS
Stig P. O. Sundgren,
BY Karl E. M. Delander
James C. Marble
Their ATTORNEY Patented Oct. 14, 1947

2,428,858

UNITED STATES PATENT OFFICE 2,428,858

SWINGABLE LENS MOUNT ASSEMBLY FOR MOTION-PICTURE PROJECTORS

Stig Per Olof Sundgren and Karl Erik Uno Selander, Lidingo, Sweden, assignors to Svenska Aktiebolaget Gasaccumulator, Lidingo, Sweden, a corporation of Sweden Application April 14, 1944, Serial No. 531,098
In Sweden May 22, 1943

3 Claims. (Cl. 88—17)

Our invention relates to swingable lens mount assemblies for motion picture projectors.

Motion picture projectors with a swingable lens mount assembly are already known, the principal parts of the assembly consisting of a lens holder, a door of the film gate and a guide roller, assembled to constitute a swingable unit.

In order to prevent the pressure shoes of the door of the film from impeding the swinging of the assembly, the shoes are in some cases made of comparatively narrow width, which arrangement, however, has involved the disadvantage that the film is very rapidly worn out. Attempts have been made to enable the lens mount assembly to swing freely by chamfering the shoes to a rather considerable extent, which means, however, that the contact surface of a shoe upon the film is very much reduced, resulting in the same disadvantage as caused by the use of narrow shoes, that is, the film is rapidly worn out. Other lens mount assemblies have been constructed, which, by their swinging around an axis perform a movement of the door of the film gate which is parallel to the projector aperture, but as far as we know, such devices have not come into use in practice.

In lens assemblies, hitherto known, the axis of swinging has always been placed outside the frame of the projector the result of which has been, partly, that the desirable minimum distance between the axis and the extension of the film plane has not been obtained, and, partly, that it has been necessary to chamfer the outer pressure shoe to a nondesirable degree. Without being chamfered to a considerable extent, the outer pressure shoe would cause a slanting encroachment upon the edge of the gate. Furthermore, known devices without parallel movement of the door of the film gate involve the disadvantage of the inner flange of the guide roller, that is the flange next to the axis, having an unfavourable effect upon the teeth of the intermittent sprocket.

The disadvantages mentioned above are, however, remedied by the present invention. According to the invention, the axis of the assembly is placed close to or inside the frame of the projector, so that the distance between the axis of swinging and the film plane is practically nil. If the axis is placed as indicated above and the guide roller is formed in a special way, the necessity of chamfering the pressure shoes or using narrow shoes is eliminated, and the film is thus prevented from being worn out too quickly. The swinging of the assembly according to the invention can thus take place without the apparatus or the film being unfavourably affected, the guide roller being made in two parts, one inner and one outer part, of which the inner part is made resiliently movable axially.

The invention is illustrated on the drawings attached hereto. Fig. 1 shows, seen from above, the position of the swinging assembly relative to the frame of the projector, Fig. 2 shows the guide roller, partly in section, Fig. 3 is a cross-sectional view taken on the line 3—3 of Fig. 1, and Fig. 4 shows the guide roller and the intermittent sprocket.

In Fig. 1 number 1 indicates the gate, number 2 the film, number 3 the outer pressure shoes and number 3' the inner pressure shoe. The lens mount assembly 4 is pivoted on the shaft 5, which is placed in the frame of the projector 6 in such a way that the minimum distance between the shaft and the plane of the film in the gate is obtained.

The pressure shoes are supported in the lens mount assembly 4 in the manner shown more particularly for the outer shoe 3 in Fig. 2. Each shoe is formed with upper and lower hook shaped members 20 and 22, respectively, the members 20 slidably engaging a rod 24 carried by the lens mount and the members 22 slidably engaging a projection 26. A bifurcated spring 28 having spaced legs 30 bearing against the pressure shoes serves to urge the latter into contact with the film in the gate. The tension of this spring may be adjusted by a screw 32.

The guide roller shown in Figs. 2 and 3 consists of two roller parts, one inner roller 7, and one outer roller 8, and a bearing 9, the rollers and the bearing being arranged on a shaft 10 and supported by an arm 11, connected to the bearing 9. By means of a spiral spring 14, the roller 7 is made to move resiliently along the shaft 10. The arm 11 is swingably and resiliently attached to the lens holder by means of a spring 34, so that in a known manner the rollers are resiliently held against the film 2, where it passes over the intermittent sprocket 13.

Fig. 4 shows schematically how the intermittent sprocket 13 and the inner guide roller 7 cooperate. When swinging the lens holder, together with the guide roller away from the intermittent sprocket, as indicated by the arrow, a calotte-shaped cam surface 15 on the outer flange of the inner guide roller 7 strikes the outer flange 16 of the intermittent sprocket 13, resulting in the roller 7 being moved along the shaft 10 against the action of the spiral spring 14 and clearing of the tooth 17 of the intermittent sprocket 13. In that way the risk of damage to the teeth of the intermittent sprocket is eliminated. The same thing happens when the assembly is swung back.

The invention is not limited to the embodiment shown in the drawing but can be modified in various ways within the scope of the invention.

What is claimed:

1. In a moving picture projector, a frame, a film gate mounted on said frame, a sprocket wheel for feeding a film through said gate, a lens, a holder for said lens, means for pivotally mounting said holder on said frame about an axis disposed substantially in a continuation of the plane of said film in the gate, pressure shoes pivotable with said holder for holding the film in said gate, and a guide roller movable with said pivoted holder for cooperating with said sprocket wheel to maintain said film in engagement with the wheel, said guide roller including flanges at opposite ends thereof, the flange which is closer to said axis being movable axially with respect to the other flange.

2. In a moving picture projector, a frame, a film gate mounted on said frame, a sprocket wheel for feeding a film through said gate, a lens, a holder for said lens, means for pivotally mounting said holder on said frame about an axis disposed substantially in a continuation of the plane of said film in the gate, pressure shoes pivotable with said holder for holding the film in said gate, a guide roller movable with said pivoted holder for cooperating with said sprocket wheel to maintain said film in engagement with the wheel, said guide roller including flanges at opposite ends thereof, the flange which is closer to said axis being movable with respect to the other flange, and resilient means for yieldably urging the first-mentioned flange towards said other flange.

3. In a moving picture projector, a frame, a film gate mounted on said frame, a sprocket wheel for feeding a film through said gate, a lens, a holder for said lens, means for pivotally mounting said holder on said frame about an axis disposed substantially in a continuation of the plane of said film in the gate, pressure shoes pivotable with said holder for holding the film in said gate, and a guide roller movable with said pivoted holder for cooperating with said sprocket wheel to maintain said film in engagement with the wheel, said guide roller including flanges at opposite ends thereof, the flange which is closer to said axis being movable axially with respect to the other flange, the inner face of the first-mentioned flange being conical.

STIG PER OLOF SUNDGREN.
KARL ERIK UNO SELANDER.

REFERENCES CITED

The following references are of record in the file of this patent:

UNITED STATES PATENTS

| Number | Name | Date |
|---|---|---|
| 1,455,367 | Uhlemann | May 15, 1923 |
| 1,854,004 | Tschopp | Apr. 12, 1932 |
| 890,936 | Sandell | June 16, 1908 |
| 1,298,600 | Taylor | May 25, 1919 |
| 1,342,681 | Jenkins | June 8, 1920 |
| 2,232,811 | Sperry | Feb. 25, 1941 |

FOREIGN PATENTS

| Number | Country | Date |
|---|---|---|
| 376,868 | Great Britain | July 21, 1932 |
| 637,888 | Germany | Nov. 5, 1936 |